Oct. 28, 1947.  F. D. PRAGER  2,429,943
PASSING LIQUID DOWNWARD THROUGH FIRST AND SECOND BEDS
OF ZEOLITE AND THEREAFTER PASSING LIQUID DOWNWARD
THROUGH SAID SECOND AND FIRST BEDS OF ZEOLITE
Filed Dec. 18, 1944
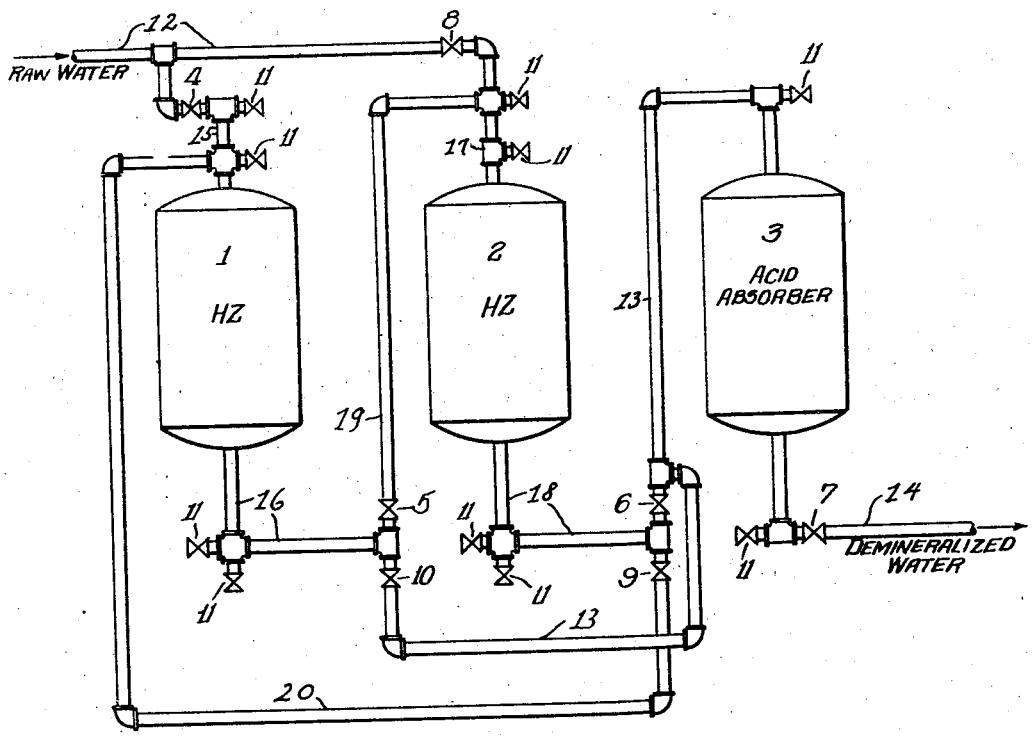
INVENTOR.
Frank D. Prager Patented Oct. 28, 1947

2,429,943

UNITED STATES PATENT OFFICE 2,429,943

PASSING LIQUID DOWNWARD THROUGH FIRST AND SECOND BEDS OF ZEOLITE AND THEREAFTER PASSING LIQUID DOWNWARD THROUGH SAID SECOND AND FIRST BEDS OF ZEOLITE

Frank D. Prager, Chicago, Ill., assignor to Graver Tank & Mfg. Co., Inc., a corporation of Delaware Application December 18, 1944, Serial No. 568,750

2 Claims. (Cl. 210—24)

This invention relates to liquid treatment and particularly to the softening or demineralizing of water by means of organic zeolite in the hydrogen cycle.

It is an object of this invention to reduce the color throwing of such zeolite.

Another object is to provide a plant which is efficient, flexible, and economical.

These and other objects will be completely understood on consideration of the following disclosure in connection with the drawing, the sole figure of which shows a diagram of an embodiment of this invention.

The plant comprises at least two tanks 1 and 2 which together contain a certain mass of organic zeolite. Since the zeolite is used in hydrogen cycles, the tanks are designated by the letters "HZ," the letter "H" standing for hydrogen and "Z" for zeolite. The plant also comprises a third tank 3 containing a material which is capable of absorbing the acid in the water discharged from the hydrogen zeolite tanks 1 and 2. Accordingly, this tank 3 is designated as an acid absorber.

A piping system is provided whereby the tanks 1, 2, and 3 can be used in series, the partial series of tanks 1 and 2 being reversible, and the tank 3 always being the last one of the complete series. The flow of water is downward through each of the three tanks, during normal operation.

For these purposes the plant comprises: a valve 4 connected to the top of the hydrogen zeolite tank 1 and adapted to admit raw water to this tank; a valve 5 connected to the bottom of the hydrogen zeolite tank 1 and adapted to admit water from that tank to the top of the hydrogen zeolite tank 2; a valve 6 connected to the bottom of the hydrogen zeolite tank 2 and adapted to admit the water from that tank to the top of the acid absorber tank 3; a valve 7 connected to the bottom of the acid absorber tank 3 and adapted to discharge demineralized water to the point of use or storage; a valve 8 connected to the top of the hydrogen zeolite tank 2, and adapted to admit the raw water to the same; a valve 9 connected to the bottom of the hydrogen zeolite tank 2 and adapted to admit water from that tank to the top of the hydrogen zeolite tank 1; and a valve 10 connected to the bottom of the hydrogen zeolite tank 1 and adapted to admit water from that tank to the top of the acid absorber tank.

In addition to these valves 4 to 10 I also provide conventional valves 11 for the regeneration of the various materials in the tanks 1, 2, and 3.

It will be noted from the above that each hydrogen zeolite tank, 1 as well as 2, has connections at the top thereof whereby either raw water can enter the top, through the valve 4 or 8, or water from the other hydrogen zeolite tank 2 or 1 can enter said top, through the valve 9 or 5. Furthermore, each hydrogen zeolite tank, 1 as well as 2, has connected to the bottom thereof a valve 5 or 9, whereby the water from the tank can be admitted therefrom to the top of the other hydrogen zeolite tank, 2 or 1, and also a valve 10 or 6 whereby the water from the first mentioned tank can be admitted to the acid absorber tank 3. In other words, the unit or partial series 1—2 consists of tank means containing a mass or body of hydrogen zeolite, which body in turn consists of two parts. The tank means is adapted, by the valves described, to receive water, first, at a certain part of said body, adjacent the top of tank 1, and later, at another part of said body, spaced from the first part, adjacent the top of tank 2. In either case, the tank means is adapted, by said valves, to discharge water at a part of said body spaced from the receiving part; that is, first at the bottom of tank 2 and then at the bottom of tank 1.

The valves and tanks are shown as interconnected with conventional pipes by fittings, not numbered, in manner well known to the art. Of course, various types of manual or automatic valves or valve ports, either individual or multiport or otherwise, can be used. Proper materials must be used in the various ducts, inasmuch as several of the liquid flows encountered are corrosive. Functionally, the plant generally requires: a header conduit 12 for raw water, connected to the raw water inlet valves 4 and 8; a header 13 for water treated by the hydrogen zeolite, connected to the bottom outlet valves 10 and 6 and forming an inlet pipe for the acid absorber tank 3; and an outlet pipe 14 for the acid absorber tank 3, connected to the valve 7 at the bottom thereof. Top and bottom connections for the hydrogen zeolite tank 1 are numbered 15 and 16 respectively, and connected to the valves 4, 5, 9, and 10 as described. Top and bottom connections 17 and 18 for the hydrogen zeolite tank 2 are similarly connected to the valves 5, 8, 6, and 9. Intermediate connections or ducts 19 and 20 form connections, respectively, between the bottom of tank 1 and top of tank 2 and vice versa between the bottom of tank 2 and the top of tank 1, with the valves 5 and 9 interposed on said respective ducts.

In operation, the tanks 1 and 2 form a unit or partial series, followed by the tank 3. During the normal demineralizing service, the raw water flows into the unit of tanks 1 and 2; treated water leaves this unit and flows into tank 3, and demineralized water leaves the latter unit toward the point of use or storage.

Such normal demineralizing service can be carried out until the capacity of the unit of tanks 1 and 2 or that of tank 3 has been practically exhausted; that is, until the hydrogen zeolite or the acid absorber has been sufficiently saturated with materials to be taken up, thereby causing a so-called "breakpoint" to occur. Such a breakpoint is reached when a demineralized water is produced which no longer complies with a predetermined standard of purity or composition. Ordinarily, this breakpoint occurs, in a hydrogen zeolite plant, when the hydrogen zeolite has absorbed from the water between 6,000 and 12,000 grains of minerals, expressed as $CaCO_3$, per cubic foot of zeolite; the amount of water treated or minerals removed up to that time being known as breakpoint capacity. The actual breakpoint capacity of each zeolite bed, between said limits, is a function of various physical and chemical characteristics of the zeolite and of the water, among other things. The breakpoint capacity of the acid absorber, similarly, is a function of numerous variables, and is frequently assumed to be somewhere between 20,000 and 30,000 grains as $CaCO_3$ per cubic foot. After the breakpoint has been reached, an exchange process would still continue, but at a decreased efficiency, especially as to some of the Ca, Mg, Na, or other cations to be removed from the water by the hydrogen exchanger, or as to some of the acids to be absorbed by the other material. This is why the service cycle is generally terminated at, or shortly after the breakpoint. The breakpoint capacity of a unit 1—2 or 3 can be considered as a constant for all practical purposes considered herein.

I propose to use the two hydrogen zeolite tanks 1 and 2 in a partial series starting with tank 1 and ending with tank 2, during a first 50% part of the breakpoint capacity of every demineralizing service cycle, and in the sequence which uses tank 2 in the first place and tank 1 in the second place during the last 50% part of every demineralizing service cycle. In detail, the circuits for the water during the first and second 50% parts of the service cycle are as follows. First part: 12—4—15—tank 1—16—5—19—17—tank 2—18—6—13—tank 3—7—14; valves 8, 9, 10, 11 being closed. Second part: 12—8—17—tank 2—18—9—20—tank 1—16—10—13—tank 3—7—14; valves 4, 5, 6, 11 being closed. The reversal from the first to the second part requires the opening of valves 8, 9, and 10 and the closing of valves 4, 5, and 6. The regenerating valves 11 remain closed throughout the service cycle.

Thus I provide a reversal of tanks 1 and 2 at the mid-point of the demineralizing service cycle. This generally has no substantial effect on the total or practical capacity of the hydrogen zeolite in the tanks 1 and 2, but results in a marked advantage so far as the color throwing of the hydrogen zeolite is concerned. A slight increase in capacity may result also, in some instances.

Organic zeolites tend to throw color, particularly when the raw water has a high pH, or high temperature, or long period of contact with the zeolite. One of the most limiting factors in this respect is the pH of the raw water; the temperature and period of contact being subject to various limitations due to other inherent requirements of demineralization, which need not be discussed herein. For reasons involved in such inherent factors, the demineralizing plants ordinarily are designed so as to receive a raw water of a low to moderate temperature; and at least in a great majority of cases, it is possible during the regular demineralizing service to avoid objectionably prolonged periods of contact. It is much more difficult, in many instances, to provide a raw water which has a pH free from objections in connection with color throwing. Depending on the type of zeolite, the limit may be found at a pH of about 7 or 8 or 9, with waters of such low or moderate temperatures, and with such reasonable periods of contact. So long as the pH of the water is at or below this pH limit, the color throwing of the organic zeolite will be present but unobjectionable, according to most standards accepted now, whereas above said limits the color throwing tends to assume objectionable degrees, generally resulting in a water which is yellow, or brown, or in extreme cases actually black.

The degree of color throw again depends on the type of organic zeolite used; some of these zeolites being stabilized by special features provided either in a natural process of zeolite formation or in a manufacturing or finishing process. Most organic zeolites require special finishing operations to at least reduce the color throw. These finishing steps are expensive, and furthermore, ineffective to fully eliminate the color throw. For this reason, there is still a pronounced need for the improvement disclosed herein, involving a color-throw reducing process of using a hydrogen zeolite, regardless how the zeolite was made.

This color throwing is further subject to variation as the demineralizing cycle proceeds. It is at a minimum in the beginning, and at a maximum at the end or breakpoint of a demineralizing cycle, assuming uniform pH and temperature of the water, and uniform flow rates. The reason is that in the beginning of a demineralizing cycle the water is promptly acidulated as it hits the surface of the freshly regenerated bed; at this time the pH of the water may frequently drop from a value as high as about 10 to a value as low as about 3; or the drop may be even greater. As a result, there is substantially no contact between any high-pH water and organic zeolite, during the first part of the demineralizing cycle. It must be noted, further on, that during this first part of the demineralizing cycle, the bulk of the treatment effected by the hydrogent zeolite takes place in or adjacent the top layer of the zeolite bed.

However, as the treatment continues the replaceable hydrogen, or the treatment capacity, of the top layer gradually exhausts itself. Thus, there is a tendency for the bulk of the treatment to be effected in layers, which progress downwardly through the zeolite bed as the cycle proceeds. Towards the end of the breakpoint capacity cycle, the bulk of the treatment occurs in or adjacent the bottom layer of the zeolite bed.

Obviously in a series of tanks like 1 and 2, the bottom layers of the first tank and the top layers of the second tank of the series are subject to the same conditions as the middle layers of a single tank of equal capacity and area would be, so far as this color throwing is concerned. It is understood, of course, that the water will not flow down through a zeolite bed in a purely geometrical, straight lined or cylindrical progression; but the progression of the water very nearly approximates this ideal, since adequate top and bottom distributing systems (not shown) are generally used in the tanks in well known manner.

If the partial series starting with tank 1 and ending with tank 2 were maintained throughout a breakpoint capacity cycle, a relatively high degree of color throw would be reached toward the end of that cycle. I propose, instead, to reverse the series when the capacity is practically half exhausted, that is, when 50% of the breakpoint capacity has been exhausted. As a result, the color throwing never reaches such a high degree. Such little color throwing as still exists, in accordance herewith, is frequently tolerable and unobjectionable.

It will be noted that I show two, or generally, a set or plurality or series of hydrogen zeolite tanks of equal, individual capacity, and I divide the breakpoint capacity cycle of the hydrogen zeolite plant into as many equal parts as corresponds with the number of tanks of equal, individual capacity. Even with a single tank the process hereof could be carried out. It is only necessary to pass the water into and through the zeolite along different paths during different parts of the service cycle.

Various modifications can be applied.

I claim:

1. In the process comprising the repetitive steps of passing a liquid to be treated through organic zeolite in hydrogen cycle and then regenerating said zeolite, the improvement which comprises the steps of passing such liquid downwardly through a first bed of such zeolite and then downwardly through at least one other bed of such zeolite, until a predetermined part of the zeolite capacity is exhausted; thereafter passing such liquid downwardly through such other bed and then downwardly through said first bed, until a further part of the zeolite capacity is exhausted; and thereafter regenerating said beds.

2. In the process comprising the repetitive steps of passing a liquid to be treated through organic zeolite in hydrogen cycle and then regenerating said zeolite, the improvement which comprises the steps of passing such liquid downwardly through a first bed of such zeolite and then downwardly through a second bed of such zeolite, until one-half of the breakpoint capacity of the zeolite is exhausted; thereafter passing such liquid downwardly through said second bed and then downwardly through said first bed, until said breakpoint capacity is fully exhausted; and thereafter regenerating said beds.

FRANK D. PRAGER.

REFERENCES CITED

The following references are of record in the file of this patent:

UNITED STATES PATENTS

| Number | Name | Date |
|---|---|---|
| 1,688,915 | Astrom | Oct. 23, 1928 |
| 1,818,638 | McGill | Aug. 11, 1931 |
| 1,903,958 | Clark | Apr. 18, 1933 |
| 2,127,310 | Riley | Aug. 16, 1938 |
| 2,155,318 | Liebknecht | Apr. 18, 1939 |
| 2,217,692 | McGill | Oct. 15, 1940 |
| 2,226,134 | Liebknecht | Dec. 24, 1940 |
| 2,264,402 | Pattock et al. | Dec. 2, 1941 |
| 2,267,841 | Riley | Dec. 30, 1941 |
| 2,268,607 | McGill | Jan. 6, 1942 |
| 2,301,669 | Richter | Nov. 10, 1942 |
| 2,368,574 | Shoemaker | Jan. 30, 1945 |